United States Patent
Neitzel et al.

(10) Patent No.: US 7,109,415 B2
(45) Date of Patent: Sep. 19, 2006

(54) ENCLOSURE WITH IMPROVED KNOCKOUTS

(75) Inventors: Roger S. Neitzel, Escondido, CA (US); Ken R. Venegas, San Diego, CA (US)

(73) Assignee: Rain Bird Corporation, Glendale, CA (US)

( * ) Notice: Subject to any disclaimer, the term of this patent is extended or adjusted under 35 U.S.C. 154(b) by 0 days.

(21) Appl. No.: 11/213,140

(22) Filed: Aug. 26, 2005

(65) Prior Publication Data

US 2006/0042813 A1    Mar. 2, 2006

Related U.S. Application Data

(60) Provisional application No. 60/604,885, filed on Aug. 27, 2004.

(51) Int. Cl.
*H02G 3/08* (2006.01)
(52) U.S. Cl. ............ 174/50; 174/53; 174/57; 174/58; 439/535
(58) Field of Classification Search .......... 174/50, 174/57, 53, 58, 65 R; 220/3.2, 3.3, 4.02; 439/535; 248/906
See application file for complete search history.

(56) References Cited

U.S. PATENT DOCUMENTS 5,444,183 A    8/1995  Gehrs et al.
6,239,368 B1 *  5/2001  Gretz .................. 174/57
6,242,697 B1    6/2001  Gerken et al.
6,765,147 B1    7/2004  Weiss et al.

OTHER PUBLICATIONS

Hi-Tech Controls, Inc.; "Liquid Tight Industrial Enclosures & Accessories;" Jun. 2004; pp. 1 and 6; Hi-Tech Controls, Inc., Centennial, CO, U.S.A., no date.

* cited by examiner

*Primary Examiner*—Dhiru R. Patel
(74) *Attorney, Agent, or Firm*—Fitch, Even, Tabin & Flannery; Scott J. Menghini

(57) ABSTRACT

Molded enclosures including integrally formed knockouts are described herein. In one implementation, a molded enclosure a wall having a wall thickness and a first knockout integrally formed in the wall. At least a portion of a periphery of the first knockout is defined by at least one attachment tab formed at a portion of the periphery of the first knockout and at least one space is formed at the periphery of the first knockout separating a portion of the wall from a portion of the first knockout, the at least one attachment tab joining the first knockout to the wall. Upon removal of the first knockout from the wall, a first opening is defined in the wall.

35 Claims, 5 Drawing Sheets

SECTION A-A

SECTION B-B

SECTION B-B

SECTION A-A

SECTION B-B

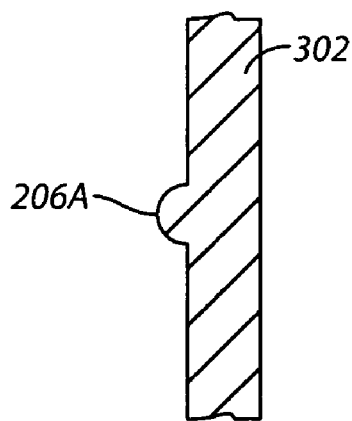
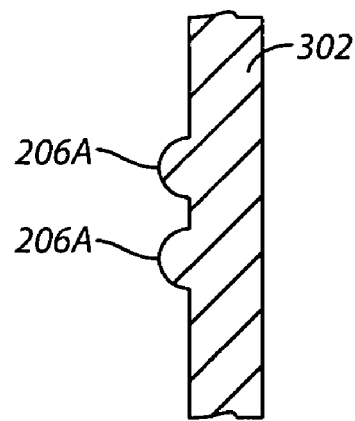
FIG. 13     FIG. 14
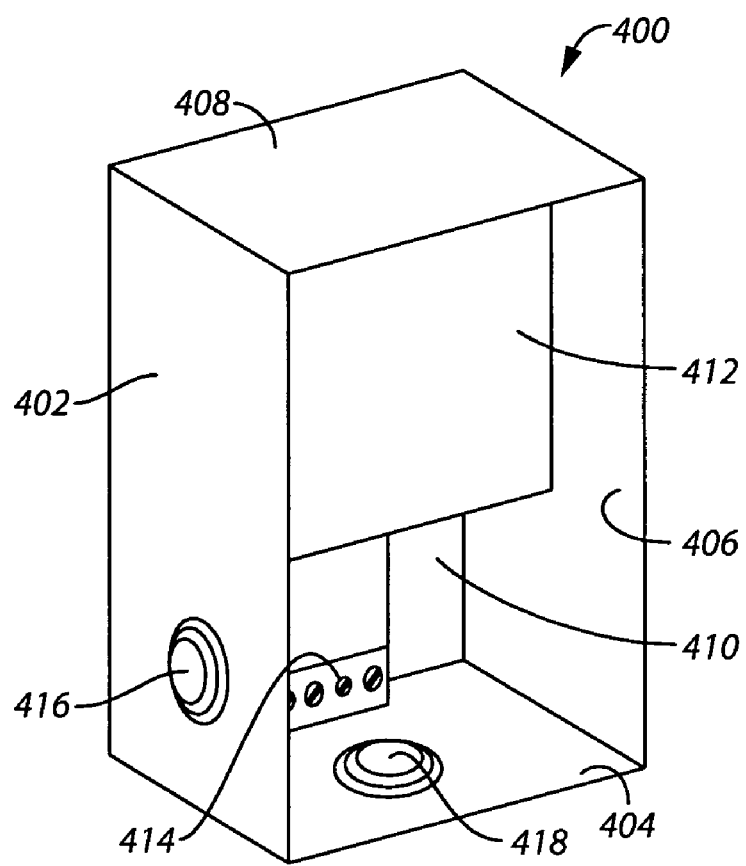
FIG. 15

ENCLOSURE WITH IMPROVED KNOCKOUTS

This application claims the benefit of U.S. Provisional Application No. 60/604,885, filed Aug. 27, 2004, entitled ENCLOSURE THAT HOUSES ELECTRICAL CONNECTIONS WITH IMPROVED KNOCKOUTS, the entire disclosure of which is incorporated herein by reference.

BACKGROUND OF THE INVENTION

1. Field of the Invention

The present invention relates generally to enclosures, and more specifically to molded enclosures that includes knockouts.

2. Discussion of the Related Art

Molded plastic enclosures for various devices often include predefined knockouts that can be removed to allow access into the enclosure. For example, knockouts are removed to gain access for installing conduit fittings or electrical wires. Typically, referring to FIGS. 1 and 2, a continuous, substantially V-shaped groove 104 extends around the periphery of the knockout 102 such that the knockout can be removed through the application of an impact force to the knockout. Additionally, as shown in FIGS. 3 and 4, smaller nested knockouts 106 can be formed within other knockouts, such as larger knockout 102.

Existing molded-in knockout designs present difficulties in the injection molding process. For example, since the thickness of the wall is substantially reduced at the V-shaped groove 104, the plastic material flow is restricted around the periphery of the knockout as it flows across the V-shaped groove making it difficult to fill the knockout plug (center) causing potential cosmetic and injection molding issues. Such plastic flow is even more restricted with nested knockout configurations, as the plastic must flow across multiple, continuous V-shaped grooves.

Furthermore, it can be difficult to remove molded-in knockouts in plastic enclosures. Often, the user will need to repeatedly strike a screwdriver (or other tool) with a hammer to try to remove a molded-in knockout. Since most plastic enclosures have molded-in knockouts that have a smooth continuous surface, the screwdriver tip (or other tool) can easily slide across the face of the knockout making the removal much more difficult and increasing the chance of damage to the enclosure or injury to the user. This problem is worsened with nested knockout configurations, where it is difficult for the user to remove only one of the interior knockouts without damaging, partially removing or completely removing the adjacent outer knockout. Alternatively, the user may remove the knockout by striking a screwdriver placed in the V-shaped groove at multiple locations; however, such approach requires multiple hits and may damage the enclosure.

Several solutions have been presented to provide improved enclosure knockouts. For example, U.S. Pat. No. 5,444,183, which is incorporated herein by reference, provides flow leaders across grooves that better allow material flow to the interior knockouts sections during the molding process. U.S. Pat. No. 6,242,697, which is incorporated herein by reference, provides grooves that form concentric circular nested knockouts, the smaller diameter knockouts having sharper edges and deeper grooves than larger diameter knockouts to improve knockout removal. U.S. Pat. No. 6,765,147, which is incorporated herein by reference, provides a knockout that includes a tool receptor to receive a tool and upon a twisting of the tool, the knockout is removed without applying an impact force; thus, preventing damage to any electronics components behind the knockout.

SUMMARY OF THE INVENTION

Several embodiments of the invention advantageously address the needs above as well as other needs by providing enclosures with improved knockouts and methods for making and using the improved knockouts.

In one embodiment, the invention can be characterized as a molded enclosure comprising a wall having a wall thickness and a first knockout integrally formed in the wall. At least a portion of a periphery of the first knockout is defined by at least one attachment tab formed at a portion of the periphery of the first knockout and at least one space is formed at the periphery of the first knockout separating a portion of the wall from a portion of the first knockout, the at least one attachment tab joining the first knockout to the wall. Upon removal of the first knockout from the wall, a first opening is defined in the wall.

In another embodiment, the invention can be characterized as an irrigation controller comprising a molded enclosure having a wall with a wall thickness and a first knockout integrally formed in the wall. At least a portion of a periphery of the first knockout is defined by at least one attachment tab formed at a portion of the periphery of the first knockout and at least one space is formed at the periphery of the first knockout separating a portion of the wall from a portion of the first knockout, the at least one attachment tab joining the first knockout to the wall. Upon removal of the first knockout from the wall, a first opening is defined in the wall. The controller also comprises an electronic control unit adapted to control irrigation operations of the irrigation controller and output driver circuitry coupled to the electronic control unit, the output driver circuitry accessible for electrical connection through the first opening.

In a further embodiment, the invention may be characterized as a method of removing a knockout from a molded enclosure comprising the steps: applying a force to a first knockout integrally formed in a wall, at least a portion of a periphery of the first knockout defined by at least one attachment tab formed at a portion of the periphery of the first knockout and at least one space formed at the periphery of the first knockout separating a portion of the wall from a portion of the first knockout, the at least one attachment tab joining the first knockout to the wall, wherein at least a portion of the force is normal to the first knockout; and removing the first knockout from the wall to form a first opening in the wall.

In yet another embodiment, the invention may be characterized as a method for making a molded enclosure comprising the steps: flowing a material into a mold to form a wall having a wall thickness, the mold adapted to integrally form a first knockout in the wall, at least a portion of a periphery of the first knockout defined by at least one attachment tab formed at a portion of the periphery of the first knockout and at least one space formed at the periphery of the first knockout separating a portion of the wall from a portion of the first knockout, the at least one attachment tab joining the first knockout to the wall; allowing the material to harden; and separating the mold from the hardened material.

In a further embodiment, the invention can be characterized as a molded enclosure comprising a wall having a wall thickness and a first knockout integrally formed in the wall. A portion of a periphery of the first knockout is defined by a first groove formed in a first surface of the wall and a second groove formed in a second surface of the wall, wherein the first surface is opposite the second surface. And a junction section is formed between the first groove and the second groove, the junction section joining a portion of the wall to a portion of the first knockout.

BRIEF DESCRIPTION OF THE DRAWINGS

The above and other aspects, features and advantages of several embodiments of the invention will be more apparent from the following more particular description thereof, presented in conjunction with the following drawings.

FIG. 13 is one embodiment of a tool holding feature formed as a protrusion.

FIG. 14 is an alternative embodiment of the tool holding feature of FIG. 13.

FIG. 15 is a simplified diagram of a molded enclosure including knockouts for use in an irrigation controller in accordance with one embodiment of the invention.

Figure 1:
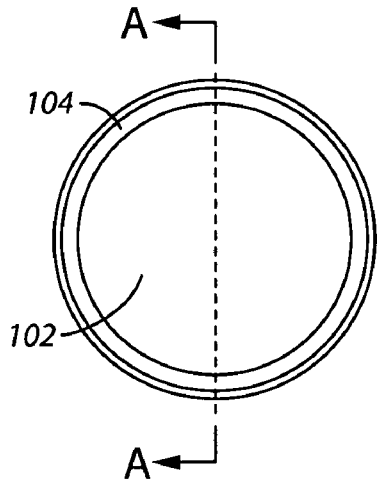
FIG. 1 is a plan view of a conventional single knockout defined by a V-shaped groove formed in a wall of the enclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Several improved knockouts formed in a wall of an enclosure housing are provided herein. It is an object of several embodiments to provide a molded-in knockout that is more easily broken-out than conventional knockouts and which reduces the chance for damage to the enclosure and components located within the enclosure.

It is an object of some embodiments to provide a tool holding feature, such as a recess or dimple, to help guide/ place a tool to more easily remove a single knockout.

It is an object of some embodiments to provide a knockout structure that is easy to fill during the injection molding process which provides for a larger, and more stable, molding process window.

It is an object of some embodiments to provide a nested knockout structure that better allows a center knockout in a nested configuration to be removed without removing the outer knockouts.

Figure 2:
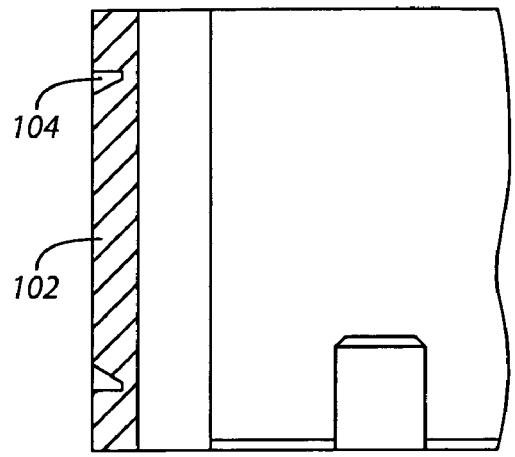
FIG. 2 is a cross sectional view of the knockout of FIG. 1 taken about line A—A.
Figure 5:
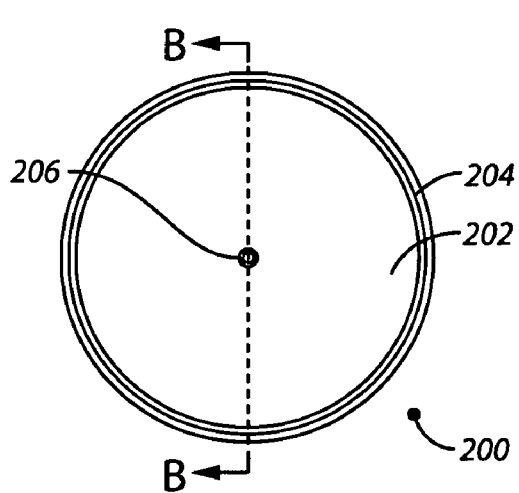
FIG. 5 is a plan view of a knockout formed in a wall of an enclosure including a split groove defining the knockout and a tool holding feature in accordance with one embodiment.
Figure 6:
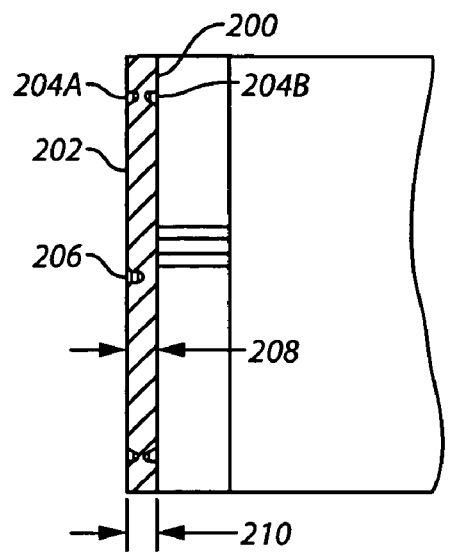
FIG. 6 is a cross sectional view of the knockout of FIG. 5 taken about line B—B of FIG. 5.

Referring first to FIGS. 5 and 6, a knockout 202 formed in a wall 200 of an enclosure is shown in accordance with one embodiment. The knockout is defined by a continuous groove 204 formed in the wall that defines the periphery of the knockout 202. In one embodiment, the groove 204 is a molded-in, substantially V-shaped groove that is split at the approximate mid-plane of the nominal wall thickness (section) that provides complete environmental protection by being completely enclosed or sealed. That is, instead of a single groove formed on one (e.g., exterior) surface of the wall, such as illustrated in FIG. 2, there is a groove formed on the exterior and interior surfaces of the wall (grooves 204A and 204B). Each groove 204A and 204B has a depth extending into the thickness of the wall and terminating proximate to the mid-plane or center of the wall thickness. Accordingly, during the molding process, e.g., injection molding process, the thin wall section formed at the junction between the grooves 204A and 204B (i.e., a junction section) is shifted away from the edge of the exterior and interior surfaces of the wall 200. As is well known during the injection molding process, material flow at the outer wall of the molding cools before material flowing through a central region or interior portion of molding. Thus, by moving the thin junction section between the wall 200 and the knockout 202 formed by the grooves away from the outer walls of the molding, the material flow through the thin junction section formed by the grooves 204A and 204B into the knockout will flow more easily and is less restricted since it has cooled less than compared to the flow across single grooves formed on one surface of an enclosure wall. This allows the knockout to be more easily and uniformly filled. Also, the split groove feature allows the thickness of the junction section formed by the grooves 204A and 204B to be thinner than the junction section of a single conventional V-shaped groove on one surface of the wall.

Additionally, the split groove feature reduces damage to the enclosure wall 200 when the knockout is removed since the junction section joining the knockout 102 to the wall 200 is moved away from the edge of the wall toward the center. For example, if the junction section is located at the edge (e.g., as in a single groove as illustrated in FIG. 2), when the knockout 102 is removed, sometimes a portion of the wall may fray or break out along with the knockout. That is, the part of the wall 200 tears away and remains connected to the removed knockout. The result is that the remaining wall portion may be damaged, and at least is unsightly to the user. In contrast, by moving the junction section away from the edge of the wall, such as provided by the split groove feature, the break between the wall and the knockout is less likely to result in the remaining wall being damaged.

The split groove feature, e.g., grooves formed on opposite surfaces of the wall, also allows nested knockouts to be more easily filled. For example, by using grooves 204A and 204B for the grooves in the nested knockout of FIGS. 3 and 4, material flow to the outer knockout 102 and the inner knockout 106 is improved since the material flow through the thin wall section at the grooves would be cooled less than if the standard V-shaped groove on a single surface was employed.

It is noted that the grooves 204A and 204B may be a variety of differently shaped grooves as known in the art, such as V-shaped grooves, tab or rectangular grooves, or grooves that have sloped walls (like a V-shaped groove) but a flat section at the tip (like a tab groove), etc. Additionally, it is understood that the molding techniques and materials used to form the enclosure wall and knockout(s) are not limited to polymer or plastic injection molding. For example, this and other embodiments also apply to die cast and Thixomolding (metal injection molding), and other known molding techniques. For example, in one embodiment, a molten material (plastic, polymer, metal) is flowed into a mold, the mold shaped to form a wall having a knockout integrally formed in the wall. The molten material is hardened (e.g., cooled) and then the mold is separated from the hardened material to reveal the wall with the integral knockout.

An additional feature illustrated in FIGS. 5 and 6 is a tool holding feature 206 (which is illustrated as a recess or dimple feature) that is formed in an outward facing surface of the knockout 202. The tool holding feature 206 is adapted to locate and hold the tip of a tool, such as a Phillips head or flat-head screwdriver, to aid in the removal of the knockout 202 from the wall 200. In some embodiments, the tool holding feature 206 is a feature that is formed into the thickness of the knockout wall, while in other embodiments, the tool holding feature 206 protrudes from the knockout wall surface, such as in the embodiments illustrated in FIGS. 13 and 14. In either case, generally, the user positions the tip of a screwdriver into or against the tool holding feature 206 and uses an additional tool, such as a hammer, to hit the end of the screwdriver to apply an impact force that breaks the knockout free. Thus, the tool holding feature 206 aids with the removal of the knockout. In the illustrated embodiment of FIGS. 5 and 6, the tool holding feature 206 is a recessed, substantially spherical dimple formed in a portion of the exterior facing surface of the knockout 202 to locate and hold the tool in place for the user to strike the tool to remove the knockout. As noted above, in other embodiments, such as illustrated in FIGS. 13 and 14, the tool holding feature 206A is one or more protrusions extending outward from the knockout wall that allows a tool to be inserted into or thereagainst. For example, the tool holding feature 206A may be a rib-like structure that a tool rests against or a protrusion having walls that form a pocket or recess above the surface (outside of the nominal thickness of the knockout wall) of the knockout that is adapted to hold a particular tool. Such tool holding features formed as outwardly extending protrusions 206A may be more difficult to fill than a recessed feature since additional material flow is required to fill the knockout. Such tool holding features 206 prevent possible damage to the enclosure wall and lessen the chance of injury to the user relative to knockouts that have smooth continuous surfaces upon which a tool can easily slide across.

It is understood that the particular shape of the tool holding feature 206 depends upon the tool(s) that it is adapted to locate and hold. For example, the tool holding feature may be specifically shaped to hold a screwdriver tip or the shape of another tool. Furthermore, although the tool holding feature is illustrated generally at the center or central region of the knockout 202, it may be located at any location on the outward facing surface of the knockout 202. The tool holding feature 206 is typically formed as part of the injection mold or fabrication process through the shaping of the mold.

Furthermore, the tool holding feature 206 and method of breaking the knockout 202 from the wall 200 generally involves the application of an impact force having a component normal or perpendicular to the outward knockout surface. As a result of the application of this force, the knockout is forced in a direction perpendicular to the wall in the direction of the force, e.g., the knockout is forced inward into the enclosure or housing. As such, the force applied to the knockout may be directly normal to the knockout 202 or may be at an angle relative to an axis normal to the knockout 202. Although the applied force may be at an angle, the angle should be such that the component of the force in the direction normal to the knockout 202 is sufficient to cause the knockout to break free from the wall 200. For example, it is preferred that the angle be less than 30 degrees offset from normal to the knockout 202. It is noted that embodiments using a tool holding feature 206 allow a user to apply a force at an angle while lessening the chance that the tool applying the force will slip or slide on the knockout surface.

It is noted that some embodiments employing a tool holding feature do not include a split groove. Instead, such embodiments, include a single groove formed on one surface of the wall that defines the knockout 202, e.g., a V-shaped groove, a tab or rectangular groove, a combination V-shaped and tab groove, etc.

It is noted that in the illustrated embodiment of FIGS. 5 and 6, the thickness 208 of knockout 202 is substantially equal to the nominal thickness 210 of the wall 200 bordering the knockout 202. However, in additional embodiments, the mold may be adapted such that the thickness 208 of the knockout is less than the nominal thickness 210 of the wall. Thus, the knockout 202 has a thinner wall thickness than the nominal wall thickness. This aids in the molding process since less material is required to flow across the thin junction section defined by the grooves 204A and 204B (or alternatively, defined by a single groove) to fill the knockout. This also aids in the removal of the knockout without damage to the enclosure. For example, in one embodiment, the thickness 208 of the knockout 202 is approximately 60% of the nominal thickness 210 of the enclosure wall 200; however, it is understood that a variety of knockout wall thicknesses may be used depending on the implementation. For example, in one embodiment, the thickness 208 is in a range of 30–90% of the wall thickness 210, while in other embodiments within a range of 40–80%, and other embodiments in a range of 50–70%. However, it is generally desired that the wall thickness 208 be less than the nominal thickness 210 of the wall 200 but thick enough to adequately fill the knockout and provide adequate structural support. Furthermore, there may be a minimum knockout thickness 208 to meet regulatory standards for a given material, particularly with respect to enclosures for electrical housings.

Figure 3:
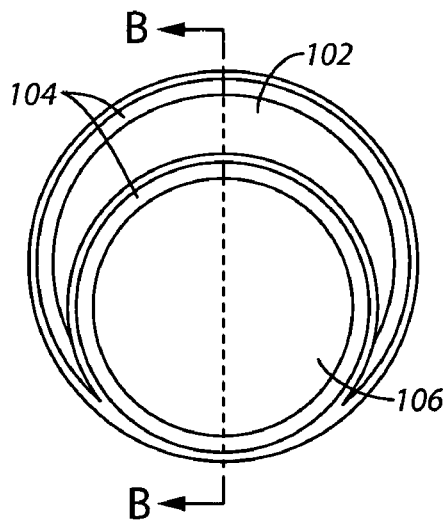
FIG. 3 is a plan view of a conventional nested knockout.
Figure 4:
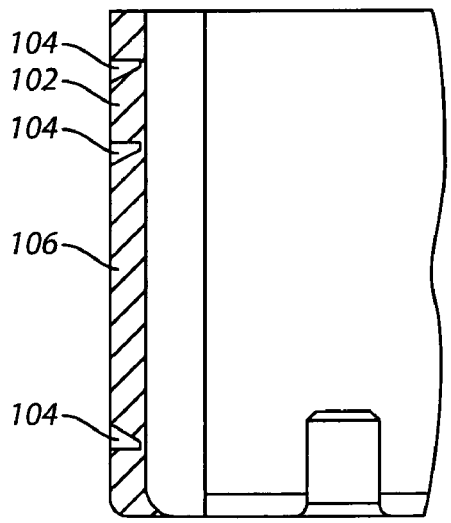
FIG. 4 is a cross sectional view of the knockout of FIG. 3 taken about line B—B.

In another variation, multiple inner knockouts or nested knockouts may be formed within an outer knockout using one or more of the features as described above. For example, a nested knockout configuration similar to that show in FIGS. 3 and 4 may be designed that uses one or more of: split grooves on opposing knockout wall surfaces; a tool holding feature on one or more of the knockout surfaces; and a reduced wall thickness 208 for the knockouts (including the inner knockouts) relative to the nominal wall thickness 210. Such nested knockouts may be concentric knockouts generally conforming to the geometry of the outer knockout (e.g., concentric circular knockouts) or may be non-concentric or offset inner knockouts (such as shown in FIGS. 3 and 4).

Figure 7:
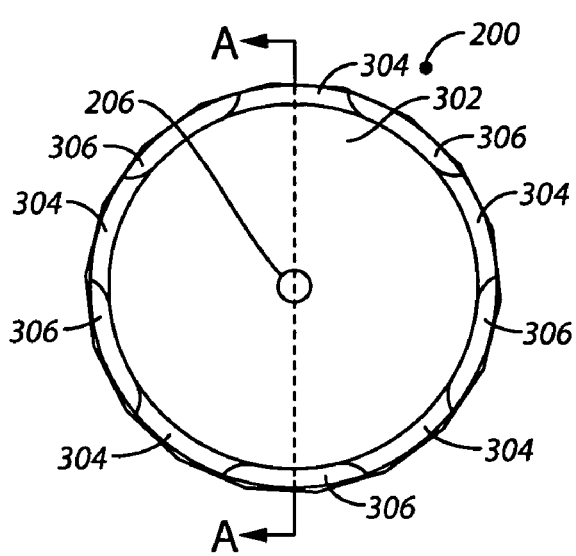
FIG. 7 is a plan view of a knockout formed in a wall of an enclosure having attachment tabs in accordance with another embodiment.
Figure 8:
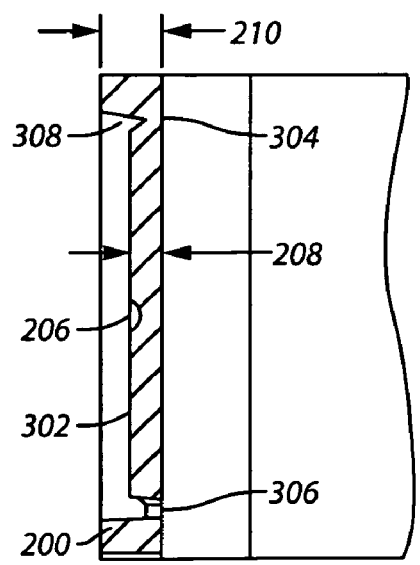
FIG. 8 is a cross sectional view of the knockout of FIG. 7 taken about line A—A of FIG. 7.

Referring next to FIGS. 7 and 8, a knockout 302 formed in a wall 200 of an enclosure is shown in accordance with another embodiment. The knockout 302 is formed by at least one molded-in attachment tab 304 and a corresponding space 306 of no material on either side of each attachment tab 304. The attachment tabs 304 and spaces 306 define the periphery of the knockout 302. Again, although the knockout is illustrated as a circular knockout, it is understood that the knockout may have any desired shape.

The attachment tabs 304 (also referred to as junction sections) provide the only material joining the knockout 302 to the enclosure wall 200. The spaces 306 provide a spacing or gap of no material between the enclosure wall and the knockout 302. This gap is minimized by the current capability of tool making and ensures a high level of environmental protection for a knockout for use in enclosures that are not required to be completely sealed. In the illustrated embodiment, the attachment tabs 304 and spaces 306 alternate about the periphery of the knockout 302, e.g., resembling a perforated connection between the knockout 302 and the enclosure wall 200.

Figure 11:
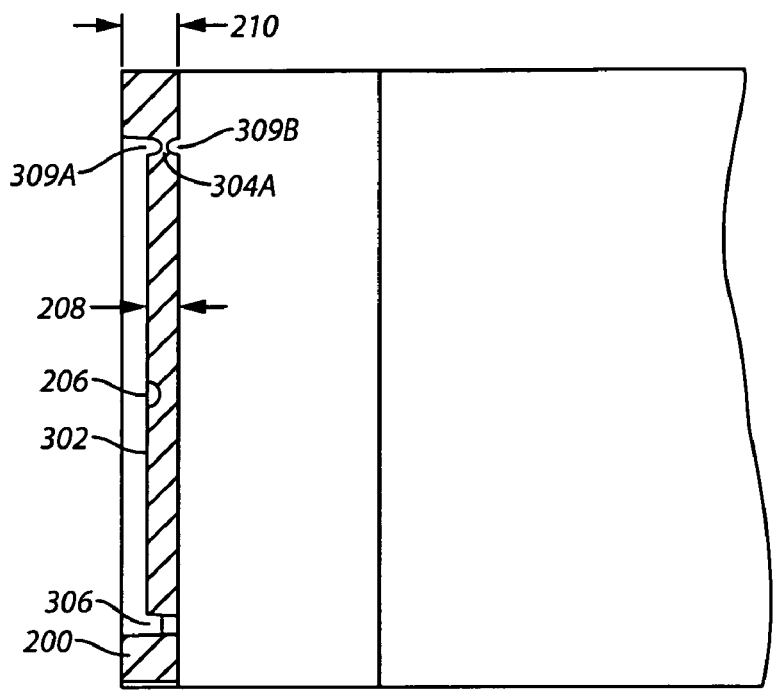
FIG. 11 is a cross sectional view of a variation of the knockout of FIGS. 7–8 in which the attachment tabs are formed using split grooves.

Each attachment tab 304 is a junction section that joins the wall to a portion of the knockout 302. The attachment tab 304 is thinner than the wall thickness 210 and thinner than the knockout thickness 208. In one form, each attachment tab 304 is formed in the wall similar to a groove described above, but extending a portion of the periphery of the knockout, not continuously about the periphery as described in the embodiments of FIGS. 5 and 6. For example, as illustrated, the attachment tabs are formed by a groove formed in one surface of the wall 200, although in other embodiments, the attachment tabs 304 may be formed by split grooves, such as described in the alternative embodiment of FIG. 11. That is, in FIG. 11, the attachment tabs 304A are formed by grooves 309A and 309B on different (e.g., opposing) surfaces of the wall. Each attachment tab 304A in FIG. 11 forms a junction section that joins a portion of the wall 200 with a portion of the knockout 302. The attachment tabs 304A formed by split grooves provide the same advantages as the split grooves described and illustrated in FIGS. 5 and 6. These grooves 309A and 309B may be shaped as any of the types of grooves described herein.

In one form, the attachment tabs 304 are formed in the surface of the wall extending a portion of the periphery of the knockout. For example, in one embodiment, the attachment tabs are formed as grooves that extend a portion of the periphery, e.g., V-shaped grooves, rectangular or tab grooves, or combination V-shaped and tab grooves. In the illustrated embodiment, the tabs 304 are formed by V-shaped grooves 308 extending a portion of the periphery and having a sharp edge along the enclosure wall 200. For example, the edge of the wall facing the knockout is a sharp wall extending substantially normal to the wall 200 to a sharp point and then the remainder of the tab 304 increases in thickness to that of the knockout plug thickness 208. It is noted that the steep wall of the V-shaped groove 308 extends substantially normal to the wall to the point of the groove 308, e.g., at an angle of 0–15 degrees offset from normal. The geometry of the V-shaped groove 308 aids in the knockout removal. When the knockout 302 is punched out as a result of the application of an impact force on the knockout 302, the knockout plug and the attachment tabs 304 breakout as one piece (at the tip of the groove 308), thus leaving little residual material in the knockout opening to better accept electrical wires, conduit fittings, or the like.

The attachment tabs 304 are designed to act as secondary injection molding gates. That is, the attachment tabs 304 are each gates that direct material flow from the wall into the knockout 302. This configuration allows for the knockout 302 to fill easily and still provides a thin cross section at the junction of the wall 200 and the knockout 302 to lessen the required force to remove the knockout. In the illustrated embodiment, since the attachment tabs 304 are formed by V-shaped grooves 308 extending a portion of the periphery of the knockout 302, the attachment tabs 304 may be referred to as secondary "knife gates".

In the illustrated embodiment of a circular knockout, five equally spaced, radially located molded-in tabs 304 are formed that together with a corresponding space 306 between each tab 304 define the periphery of the knockout. The length of the spaces 306 between the tabs 304 is approximately the same as the length of the tabs 304. It is noted that in other embodiments, a different number of tabs 304 and spaces 306 may be formed while achieving similar results. For example, at least one attachment tab and a space on each side of each attachment tab is needed according to many embodiments. In preferred form, there are between 2 and 6 attachment tabs defining the periphery of the knockout. The number of tabs 304 and spaces 306, the length of each tab extending along the periphery of the knockout 302, and the thickness of the junction formed between the wall 200 and the knockout 302 by the tabs 304 all partially determine the amount of impact force required to break the knockout 302 away from the wall 200.

Furthermore, in many embodiments, the thickness 208 of the knockout is designed to be less than the nominal wall thickness 210 to assist in the filling of the knockout during the molding process and to provide for an easy to remove knockout. For example, the knockout plug thickness 208 is approximately 60% of the nominal wall thickness 210 of the enclosure; however, it is understood that additional embodiments have different variations of thickness. For example, as described above and according to different embodiments, the thickness 208 is in a range of 30–90% of the wall thickness 210, while in other embodiments within a range of 40–80%, and other embodiments in a range of 50–70%. However, the thickness often factors in the desired ease to break the knockout out from the wall, the material used, and any regulatory minimum thicknesses that might be required. It is also noted that in some embodiments, the knockout thickness 208 is the same thickness as the nominal wall thickness 210.

Additionally, in many embodiments, a tool holding feature 206 as described above, such as a recess or protrusion, is also formed in an outward facing surface of the knockout 302. However, it is noted that several embodiments do not include a tool holding feature.

Figure 9:
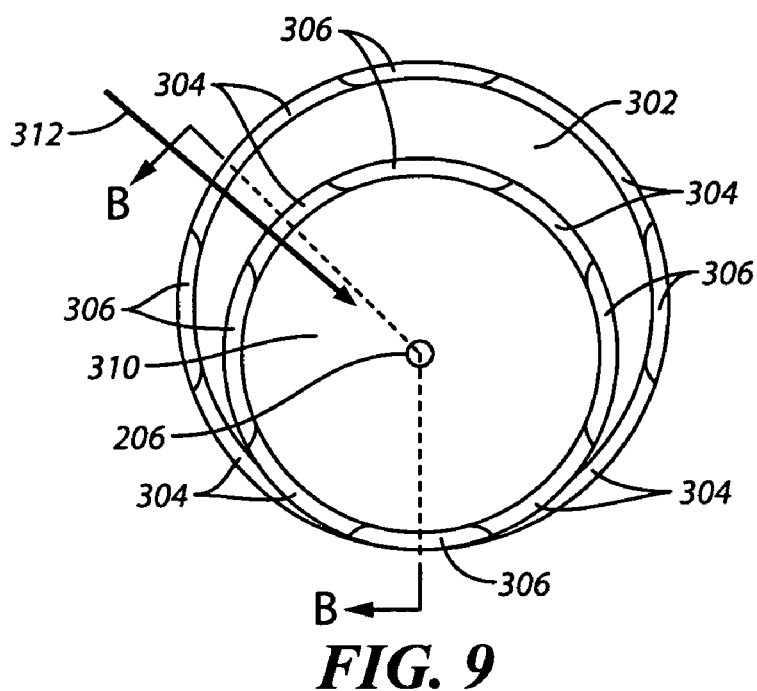
FIG. 9 is a plan view of a nested knockout design formed in a wall of an enclosure having attachment tabs in accordance with a further embodiment.
Figure 10:
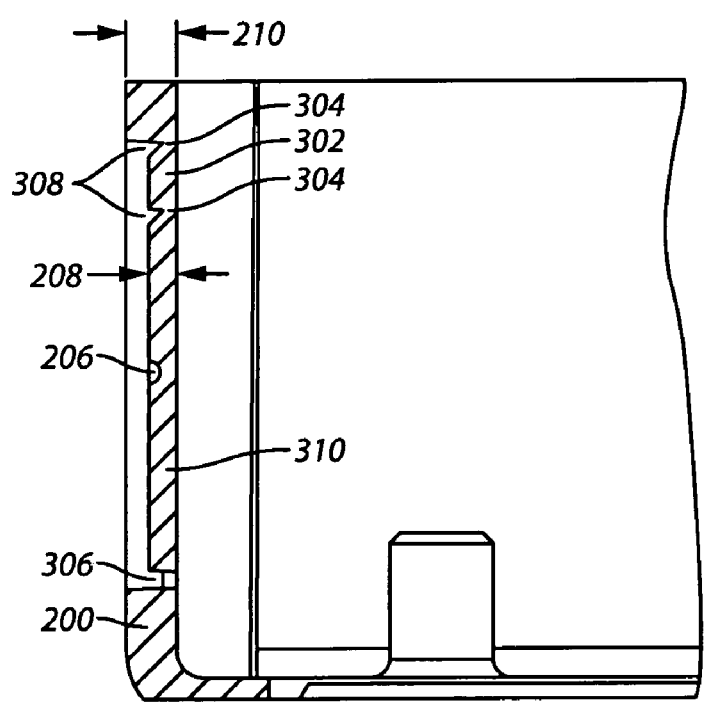
FIG. 10 is a cross sectional view of the knockout of FIG. 9 taken about line B—B of FIG. 9.

Referring next to FIGS. 9 and 10, a nested knockout design formed in a wall 200 of an enclosure having attachment tabs as described in FIGS. 7 and 8 is shown in accordance with another embodiment. Accordingly, the design of FIGS. 9 and 10 provides an outer knockout 302 and a nested knockout 310 that is smaller than the outer knockout 302. Both knockouts 302 and 310 are formed by at least one molded-in attachment tab 304 and a corresponding space 306 of no material on either side of each attachment tab 304, similar to that described in FIGS. 7 and 8. The attachment tabs 304 and spaces 306 define the periphery of each knockout 302 and 310. Thus, the outer knockout 302 is attached to the wall 200 by at least one attachment tab 304 (e.g., 4 attachment tabs are illustrated) while the inner knockout 310 is attached to the outer knockout by at least one attachment tab 304 (e.g., 4 attachment tabs are illustrated). Accordingly, in a general sense, in one embodiment, a nested knockout configuration is provided in which at least one attachment tab 304 attaches an outer knockout 302 to the wall 200 and a plurality of molded-in internal knockouts (e.g., knockout 310) are attached to its adjacent outer knockout with at least one attachment tab 304.

Again, although the knockout is illustrated as a circular knockout, it is understood that the knockout may have any desired shape. Although only a single inner knockout is illustrated (e.g., knockout 310), it is understood that additional molded-in inner knockouts may be provided that are smaller than the illustrated inner knockout 310. Additionally, inner knockouts may be concentrically or non-concentrically shaped relative to the outer knockouts. For example, in non-concentric nested knockouts as illustrated, both the outer knockout and the inner knockout share at least a portion of one attachment tab. On the other hand, for concentric nested knockouts, the outer knockout and the inner knockout do not share an attachment tab.

The attachment tabs 304 provide the only material joining the knockouts 302 and 310 to the enclosure wall 200 and the outer knockout 302, respectively. The spaces 306 provide a spacing or gap of no material between the enclosure wall and the knockout 302, or in between the outer knockout 302 and the inner knockout 310. This gap is minimized by the current capability of tool making and ensures a high level of environmental protection for a knockout for use in enclosures that are not required to be completely sealed. In the illustrated embodiment, the attachment tabs 304 and spaces 306 alternate about the periphery of the knockouts 302 and 310, e.g., resembling a perforated connection.

Each attachment tab 304 is a junction section that joins the wall to a portion of the knockout 302, or joins an outer knockout to an inner knockout. The attachment tabs 304 are thinner than the wall thickness 210 and thinner than the knockout thickness 208. In one form, each attachment tab 304 is formed in the wall similar to the grooves (split or single grooves) described above, but extending a portion of the periphery of the knockout, not continuously about the periphery as described in the embodiments of FIGS. 5 and 6. The attachment tabs 304 are designed to act as secondary injection molding gates. That is, the attachment tabs 304 are each gates that direct material flow from the wall into the knockout 302 and from knockout 302 into knockout 310. This configuration allows for the knockouts to fill easily and still provides a thin cross section at the junction at the attachment tabs 304 to lessen the required impact force to remove the knockouts.

In one embodiment, the attachment tabs 304 of adjacent knockouts are approximately aligned to improve material flow from the wall 200 to the outer knockout 302 and to the inner knockout(s) 310. For example, as illustrated in FIG. 9, attachment tabs 304 of the knockouts 302 and 310 are substantially aligned so that material flow will flow along a flow path 312 across two grooves (e.g., V-shaped grooves 308) to the inner knockout 310. Thus, the attachment tabs 304 act as secondary injection molding gates, which allow the knockouts to fill more easily and still provides a thin cross section to lessen the required force to remove the knockout. And similar to that described above, in the illustrated embodiment, the attachment tabs 304 act as secondary "knife gates" to direct material flow into the knockouts.

In one embodiment, the widths of the attachment tabs 304 are the widest for the outer most knockout 302 and decrease in width for a plurality of internal knockouts, such as knockout 310. For example, tab 304 on knockout 302 is wider than tab 304 on knockout 310. The wider attachment tabs (or alternatively, the longer the tab extends about the periphery of the knockout) require more impact force to break than the more narrow internal knockout tabs allowing the nested knockouts to be removed without accidentally removing the outer knockout plug(s). In other embodiments, the outer tabs are not wider than the inner tabs.

The illustrated embodiment for the outer most knockout 302 has four equally spaced, radially located molded-in attachment tabs 304. The length of the spaces 306 formed between the tabs 304 is approximately half the width of the attachment tab. The internal, nested knockout 310 has four equally spaced, radially located molded-in attachment tabs that are substantially aligned with the outer knockout attachment tabs, which provides an ideal flow path as described above.

Figure 12:
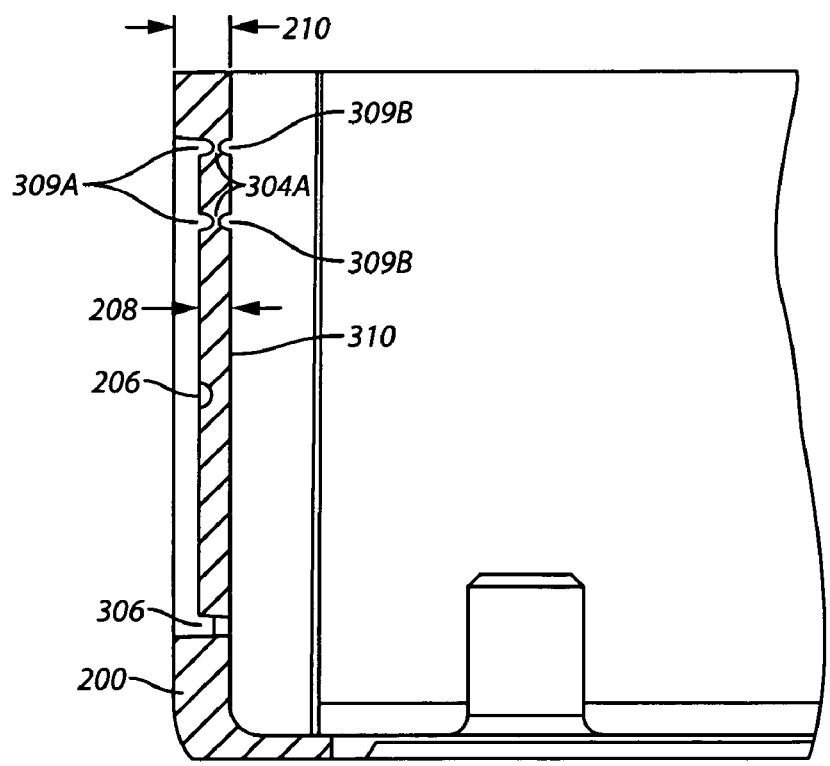
FIG. 12 is a cross sectional view of a variation of the knockout of FIGS. 7–8 in which the attachment tabs are formed using split grooves.

As described above, in the illustrated form, the attachment tabs 304 are defined by V-shaped grooves 308 formed along a portion of the periphery of the knockout that joins with the wall 200 or the adjacent outer knockout although other grooves as described herein may be used. The thickness 208 of the knockouts is typically less than the nominal wall thickness 210, as described above. Alternatively, referring to FIG. 12, the attachment tabs 304A may be formed by split grooves, i.e., formed by grooves 309A and 309B on different (e.g., opposing) surfaces of the wall. Each attachment tab 304A in FIG. 12 forms a junction section that joins a portion of the wall 200 with a portion of the outer knockout 302, and joins a portion of the outer knockout 302 with a portion of the nested knockout 310. The attachment tabs 304A formed by split grooves provide the same advantages as the split grooves described and illustrated in FIGS. 5 and 6. These grooves 309A and 309B may be shaped as any of the types of grooves described herein.

Additionally, similar to that described above, in some embodiments, the nested knockout 310 includes a tool holding feature 206, as described above. For example, a tool holding feature 206 is formed in the innermost nested knockout 310. Alternatively, the innermost knockout and other knockouts may also have a corresponding tool holding feature 206. Generally, the innermost knockout is removed first and subsequent outer knockout(s) are then removed as desired. However, it is noted that several embodiments do not include a tool holding feature.

Referring next to FIG. 15, a diagram is shown of a molded enclosure 400 including knockouts for use in an irrigation controller in accordance with one embodiment of the invention. The molded enclosure 400 includes walls 402, 404, 406, 408 and 410. Within the enclosure 400 are located irrigation electronic control unit 412 (e.g., a microprocessor, user inputs, display screen, etc.) and output driver circuitry 414. The electronic control unit 412 functions to control the irrigation operations of the controller, e.g., to store irrigation schedules and signal when to start and stop watering for multiple water valves. The valves are electrically coupled to the output driver circuitry. Knockouts 416 are formed in wall 402 and knockouts 418 are formed in wall 404. In practice, a contractor selects the appropriate knockout 414, 418 to use and size (if the knockout is a nested knockout configuration)

and removes the desired knockout(s). Once the desired knockout(s) is removed, electrical wiring is coupled through a conduit inserted into the open knockout to the output driver circuitry 414 for electrical connection to the components (such as a solenoid controlled valves) connected to the irrigation controller. It is noted that a conduit is optional and that many times, the wiring is installed directly through the removed knockout without a conduit. The molded enclosure 400 typically includes a separately molded door or cover (not shown) that hingedly attaches to the enclosure 400 to close the enclosure 400.

The knockouts 416 and 418 may be any of the knockout configurations as illustrated and described herein. It is understood that although one proposed usage of a molded enclosure is in the context of an irrigation controller, that a molded enclosure incorporating knockouts as described herein may be used on any molded enclosure for any number of applications. For example, such enclosures may be used for lighting controller equipment, fertilization control equipment or other electronic controllers. Additionally, the knockout designs provided herein also apply to molded enclosures generally, not necessarily to those enclosures that house electronic equipment.

While the invention herein disclosed has been described by means of specific embodiments, examples and applications thereof, numerous modifications and variations could be made thereto by those skilled in the art without departing from the scope of the invention set forth in the claims.

What is claimed is:

1. A molded enclosure comprising:
    a wall having a wall thickness; and
    a first knockout integrally formed in the wall, at least a portion of a periphery of the first knockout defined by at least one attachment tab formed at a portion of the periphery of the first knockout and at least one space formed at the periphery of the first knockout separating a portion of the wall from a portion of the first knockout, the at least one attachment tab joining the first knockout to the wall;
    wherein upon removal of the first knockout from the wall, a first opening is defined in the wall.

2. The enclosure of claim 1 wherein the first knockout has a first thickness that is less than the wall thickness.

3. The enclosure of claim 2 wherein the first thickness is at least 30% and not more than 90% of the wall thickness.

4. The enclosure of claim 1 wherein each of the at least one attachment tab has a tab thickness that is less than the wall thickness and less than a first thickness of the first knockout.

5. The enclosure of claim 1 wherein the at least one attachment tab is defined at a groove formed in a first surface of the wall at the portion of the periphery of the first knockout.

6. The enclosure of claim 1 wherein the at least one attachment tab is defined at a first groove formed in a first surface of the wall and at a second groove formed in a second surface of the wall.

7. The enclosure of claim 6 wherein the first surface of the wall is opposite the second surface of the wall.

8. The enclosure of claim 1 further comprising a tool holding feature formed at the first knockout, the tool holding feature adapted to receive a tool for applying an impact force on the first knockout to remove the first knockout from the wall, the impact force having a component in a direction substantially normal to the first knockout such that the first knockout is forced through the wall.

9. The enclosure of claim 8 wherein the tool holding feature comprises a recess formed into the thickness of the first knockout.

10. The enclosure of claim 8 wherein the tool holding feature comprises a protrusion extending from a surface of the first knockout.

11. The enclosure of claim 1 further comprising:
    a second knockout integrally formed in the first knockout, at least a portion of a periphery of the second knockout defined by at least one attachment tab formed at a portion of the periphery of the second knockout and at least one space formed at the periphery of the second knockout separating a portion of the first knockout from a portion of the second knockout, the at least one attachment tab joining the second knockout to the first knockout;
    wherein upon removal of the second knockout from the wall, a second opening is defined in the wall, the second opening smaller than the first opening.

12. The enclosure of claim 11 wherein the first knockout and the second knockout share at least a portion of an attachment tab.

13. The enclosure of claim 11 wherein the first knockout and the second knockout do not share an attachment tab.

14. The enclosure of claim 11 wherein an attachment tab of the first knockout is aligned with an attachment tab of the second knockout in order to allow material to flow directly through the attachment tab of the first knockout and through the attachment tab of the second knockout during a molding process.

15. The enclosure of claim 1 wherein the at least one attachment tab comprises at least 2 and not less than 6 attachment tabs.

16. An irrigation controller comprising:
    a molded enclosure having a wall with a wall thickness;
    a first knockout integrally formed in the wall, at least a portion of a periphery of the first knockout defined by at least one attachment tab formed at a portion of the periphery of the first knockout and at least one space formed at the periphery of the first knockout separating a portion of the wall from a portion of the first knockout, the at least one attachment tab joining the first knockout to the wall;
    wherein upon removal of the first knockout from the wall, a first opening is defined in the wall;
    an electronic control unit adapted to control irrigation operations of the irrigation controller; and
    output driver circuitry coupled to the electronic control unit, the output driver circuitry accessible for electrical connection through the first opening.

17. The controller of claim 16 wherein the at least one attachment tab is defined at a groove formed in a first surface of the wall at the portion of the periphery of the first knockout.

18. The controller of claim 16 wherein the at least one attachment tab is defined at a first groove formed in a first surface of the wall and at a second groove formed in a second surface of the wall.

19. The controller of claim 16 further comprising a tool holding feature formed at the first knockout, the tool holding feature adapted to receive a tool for applying an impact force on the first knockout to remove the first knockout from the wall, the impact force having a component in a direction substantially normal to the first knockout such that the first knockout is forced through the wall.

20. The controller of claim 16 further comprising:
a second knockout integrally formed in the first knockout, at least a portion of a periphery of the second knockout defined by at least one attachment tab formed at a portion of the periphery of the second knockout and at least one space formed at the periphery of the second knockout separating a portion of the first knockout from a portion of the second knockout, the at least one attachment tab joining the second knockout to the first knockout;
wherein upon removal of the second knockout from the wall, a second opening is defined in the wall, the second opening smaller than the first opening.

21. The controller of claim 20 wherein an attachment tab of the first knockout is aligned with an attachment tab of the second knockout in order to allow material to flow directly through the attachment tab of the first knockout and through the attachment tab of the second knockout during a molding process.

22. A method of removing a knockout from a molded enclosure comprising:
applying a force to a first knockout integrally formed in a wall, at least a portion of a periphery of the first knockout defined by at least one attachment tab formed at a portion of the periphery of the first knockout and at least one space formed at the periphery of the first knockout separating a portion of the wall from a portion of the first knockout, the at least one attachment tab joining the first knockout to the wall, wherein at least a portion of the force is normal to the first knockout; and
removing the first knockout from the wall to form a first opening in the wall.

23. The method of claim 22 wherein the step of applying the force comprises:
applying the force to the first knockout wherein the first knockout is integrally formed in a second knockout, at least a portion of the periphery of the first knockout defined by at least one attachment tab formed at a portion of the periphery of the first knockout and at least one space formed at the periphery of the first knockout separating a portion of the second knockout from a portion of the first knockout, the at least one attachment tab joining the first knockout to the second knockout.

24. The method of claim 23 further comprising:
applying a force to a remaining portion of the second knockout after the first knockout has been removed; and
removing the remainder of the second knockout from the wall to form a second opening in the wall, the second opening larger than the first opening.

25. A method for making a molded enclosure comprising:
flowing a material into a mold to form a wall having a wall thickness, the mold adapted to integrally form a first knockout in the wall, at least a portion of a periphery of the first knockout defined by at least one attachment tab formed at a portion of the periphery of the first knockout and at least one space formed at the periphery of the first knockout separating a portion of the wall from a portion of the first knockout, the at least one attachment tab joining the first knockout to the wall;
allowing the material to harden; and
separating the mold from the hardened material.

26. The method of claim 25 wherein the flowing step comprises flowing the material into the mold, the mold adapted to integrally form the first knockout to have a first thickness that is less than the wall thickness.

27. The method of claim 25 wherein the flowing step comprises flowing the material into the mold, the mold adapted to integrally form the first knockout such that the at least one attachment tab is defined at a groove formed in a first surface of the wall at the portion of the periphery of the first knockout.

28. The method of claim 25 wherein the flowing step comprises flowing the material into the mold, the mold adapted to integrally form the first knockout such that the at least one attachment tab is defined at a first groove formed in a first surface of the wall and at a second groove formed in a second surface of the wall.

29. The method of claim 28 wherein the first surface of the wall is opposite the second surface of the wall.

30. The method of claim 25 wherein the flowing step comprises flowing the material into the mold, the mold adapted to form a tool holding feature at the first knockout, the tool holding feature adapted to receive a tool for applying an impact force on the first knockout to remove the first knockout from the wall, the impact force having a component in a direction substantially normal to the first knockout such that the first knockout is forced through the wall.

31. The method of claim 25 wherein the flowing step comprises flowing the material into the mold, the mold further adapted to integrally form a second knockout integrally formed in the first knockout, at least a portion of a periphery of the second knockout defined by at least one attachment tab formed at a portion of the periphery of the second knockout and at least one space formed at the periphery of the second knockout separating a portion of the first knockout from a portion of the second knockout, the at least one attachment tab joining the second knockout to the first knockout.

32. The method of claim 25 wherein the flowing step comprises flowing the material into the mold through an attachment tab of the first knockout and then through an attachment tab of the second knockout aligned with the attachment tab of the first knockout.

33. A molded enclosure comprising:
a wall having a wall thickness; and
a first knockout integrally formed in the wall, a portion of a periphery of the first knockout defined by a first groove formed in a first surface of the wall and a second groove formed in a second surface of the wall, wherein the first surface is opposite the second surface;
wherein a junction section is formed between the first groove and the second groove, the junction section joining a portion of the wall to a portion of the first knockout;
wherein the junction section is located away from exterior surfaces of the wall along a direction of a thickness of the wall.

34. A molded enclosure comprising:
a wall having a wall thickness; and
a first knockout integrally formed in the wall, a portion of a periphery of the first knockout defined by a first groove formed in a first surface of the wall and a second groove formed in a second surface of the wall, wherein the first surface is opposite the second surface;

wherein a junction section is formed between the first groove and the second groove, the junction section joining a portion of the wall to a portion of the first wherein the junction section is located at a central location across a thickness of the wall.

35. The enclosure of claim 34 wherein the junction section is located to allow material flowing through a central region of the wall to flow therethrough into the first knockout during an injection molding process.

* * * * *